US012321339B1

(12) United States Patent
Dzhus et al.

(10) Patent No.: US 12,321,339 B1
(45) Date of Patent: Jun. 3, 2025

(54) METHODS AND SYSTEMS FOR REGULATORY EXPLORATION PRESERVING BANDWIDTH AND IMPROVING COMPUTING PERFORMANCE

(71) Applicant: Droit Operating Company, LLC, New York, NY (US)

(72) Inventors: Dmitry Dzhus, London (GB); Leith Holden Dennis, Chicago, IL (US); Simon Robert Docherty, London (GB); Joceline Huan Zheng, London (GB); Brock Sigurjon Arnason, New York, NY (US)

(73) Assignee: Droit Operating Company, LLC, New York, NY (US)

( * ) Notice: Subject to any disclaimer, the term of this patent is extended or adjusted under 35 U.S.C. 154(b) by 0 days.

(21) Appl. No.: 18/903,946

(22) Filed: Oct. 1, 2024

Related U.S. Application Data

(60) Provisional application No. 63/635,220, filed on Apr. 17, 2024.

(51) Int. Cl.
*G06F 16/00* (2019.01)
*G06F 16/22* (2019.01)
(Continued)

(52) U.S. Cl.
CPC ........ *G06F 16/242* (2019.01); *G06F 16/2246* (2019.01); *G06F 16/248* (2019.01)

(58) Field of Classification Search
CPC ... G06F 16/242; G06F 16/2246; G06F 16/248
(Continued)

(56) References Cited

U.S. PATENT DOCUMENTS 7,693,813 B1 4/2010 Cao et al.
9,465,865 B2 10/2016 De et al.
(Continued)

FOREIGN PATENT DOCUMENTS

CN 106202292 A 12/2016
WO WO-2019232388 A1 12/2019

OTHER PUBLICATIONS

Biagioli Carlo and Grossi, D. Formal Aspects of Legislative Meta-Drafting. Conference Paper in Frontiers in Artificial Intelligence and Applications. 11 pages (2008). Available at https://www.researchgate.net/publication/220809939.
(Continued)

*Primary Examiner* — Michelle N Owyang
(74) *Attorney, Agent, or Firm* — Wilson Sonsini Goodrich & Rosati

(57) ABSTRACT

Described are methods, systems, and media for regulatory exploration comprising: receiving a regulatory exploration request comprising a scenario comprising a desired outcome and a plurality of partial inputs to describe the scenario and identify fact constraints; receiving an executable regulatory logic flow chart, wherein each element of the flow chart is associated with a regulatory text; applying algorithm to determine all paths in the regulatory logic flow chart; filtering the paths based on the desired outcome; transforming each remaining path into a logical expression comprising attributes; generating a query space comprising conditions on the input facts associated with each attribute; generating a fact space comprising input facts associated with each attribute; generating a possibility space by joining the input facts in the fact space under the conditions in the query space; converting the possibility space to a plurality of database queries; and running the queries to generate an output.

15 Claims, 10 Drawing Sheets

(51) Int. Cl.
*G06F 16/242* (2019.01)
*G06F 16/248* (2019.01)

(58) Field of Classification Search
USPC ................................................ 707/600–899
See application file for complete search history.

(56) References Cited

U.S. PATENT DOCUMENTS

| | | | |
|---|---|---|---|
| 9,852,127 B2 | 12/2017 | Dettinger et al. | |
| 10,509,813 B1 | 12/2019 | Pemmaraju et al. | |
| 10,839,042 B1* | 11/2020 | Dias | G06F 16/906 |
| 11,977,591 B2* | 5/2024 | Narang | G06F 16/9535 |
| 12,111,857 B2* | 10/2024 | Vangala | G06N 5/022 |
| 2002/0026339 A1 | 2/2002 | Frankland et al. | |
| 2004/0243554 A1 | 12/2004 | Broder et al. | |
| 2007/0011134 A1 | 1/2007 | Langseth et al. | |
| 2009/0300471 A1 | 12/2009 | Dettinger et al. | |
| 2013/0325849 A1 | 12/2013 | De et al. | |
| 2016/0103823 A1 | 4/2016 | Jackson, Jr. et al. | |
| 2019/0370918 A1* | 12/2019 | Pemmaraju | G06F 16/335 |
| 2021/0200794 A1 | 7/2021 | Pemmaraju et al. | |
| 2022/0108175 A1* | 4/2022 | Lyske | G06F 40/30 |
| 2022/0414492 A1* | 12/2022 | Jezewski | G06N 5/04 |
| 2024/0249154 A1* | 7/2024 | Ma | G06N 3/092 |

OTHER PUBLICATIONS

Francesconi. Semantic Model for Legal Resources: Annotation and Reasoning over Normative Provisions. Semantic Web 7(3):255-265 (2016).

PCT/US2019/034927 International Search Report and Written Opinion dated Aug. 9, 2019.

U.S. Appl. No. 15/995,984 Office Action dated Aug. 27, 2018.

U.S. Appl. No. 15/995,984 Office Action dated Mar. 19, 2019.

* cited by examiner

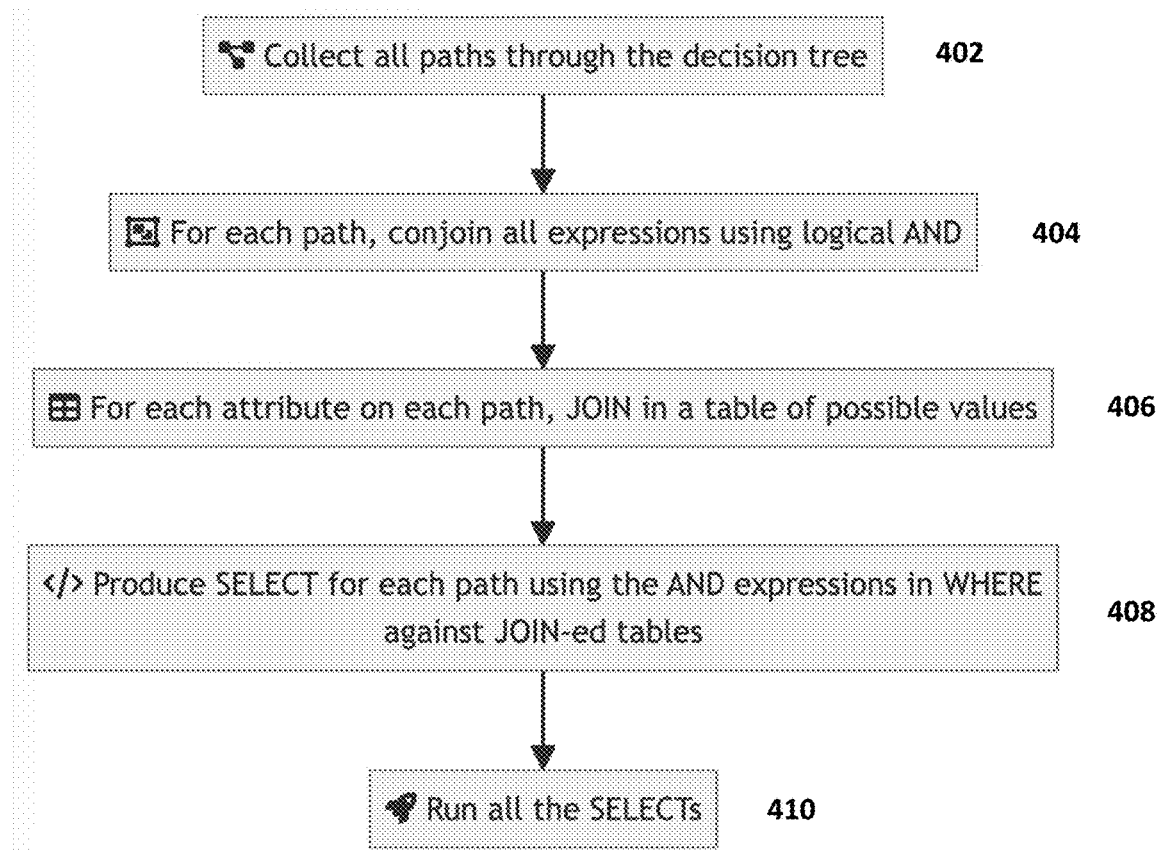

Fig. 5A

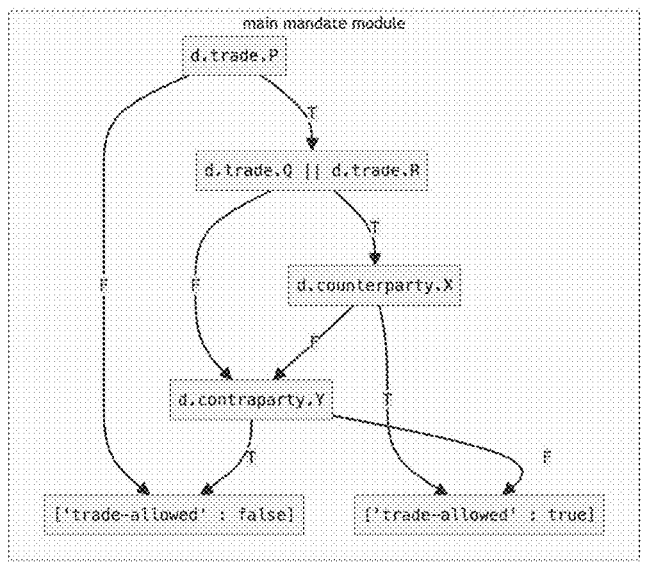

- Consider a single module first
- Apply partial input to fold constants
  trade.P = true
- Filter paths based on output filter
  trade-allowed = true
- Collect all remaining paths from a module
- Each path is a conjunction of conditions which we convert from expression language to SQL

Fig. 5B

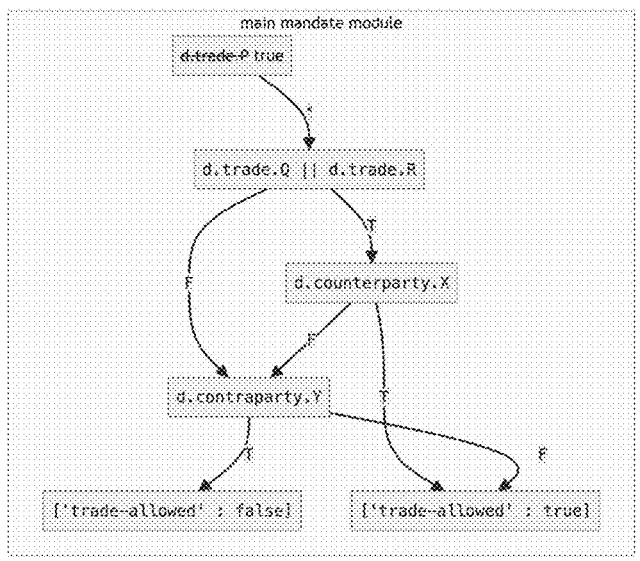

- Consider a single module first
- **Apply partial input to fold constants
  trade.P = true**
- Filter paths based on output filter
  trade-allowed = true
- Collect all remaining paths from a module
- Each path is a conjunction of conditions which we convert from expression language to SQL

Fig. 5C

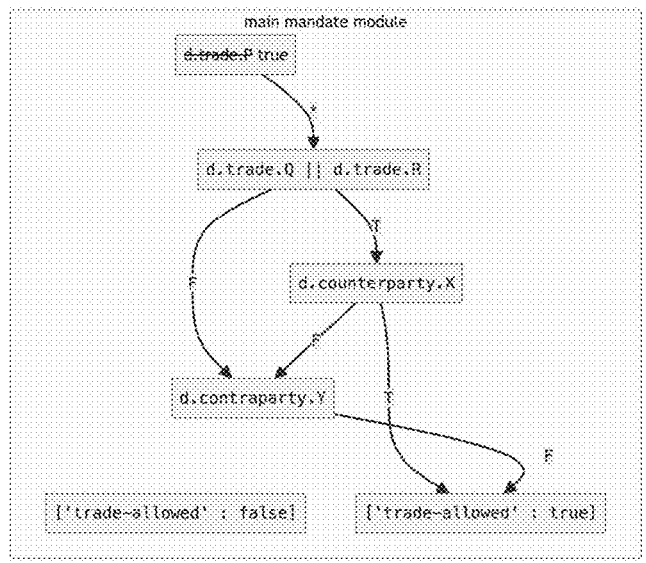

- Consider a single module first
- Apply partial input to fold constants
  `trade.P = true`
- Filter paths based on output filter `trade-allowed = true`
- Collect all remaining paths from a module
- Each path is a conjunction of conditions which we convert from expression language to SQL

Fig. 5D

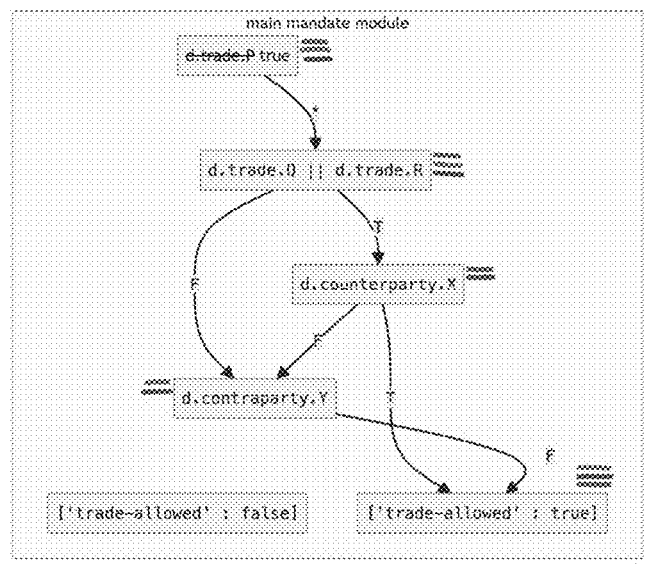

- Consider a single module first
- Apply partial input to fold constants
  `trade.P = true`
- Filter paths based on output filter
  `trade-allowed = true`
- Collect all remaining paths from a module
- Each path is a conjunction of conditions which we convert from expression language to SQL

- Each path is a conjunction of conditions which we convert to SQL.
  SELECT * FROM .. WHERE (NOT ("trade.Q" OR "trade.R")) AND NOT "contraparty.Y"
  SELECT * FROM .. WHERE ("trade.Q" OR "trade.R") AND "counterparty.X"
  SELECT * FROM .. WHERE ("trade.Q" OR "trade.R") AND NOT "counterparty.X" AND "contraparty.Y"
- Now we just need to figure out where do we select FROM

METHODS AND SYSTEMS FOR REGULATORY EXPLORATION PRESERVING BANDWIDTH AND IMPROVING COMPUTING PERFORMANCE

CROSS-REFERENCE

This application claims the benefit of U.S. Provisional Application No. 63/635,220, filed Apr. 17, 2024, which is hereby incorporated by reference in its entirety herein for all purposes.

BACKGROUND

In the world of finance, firms must adhere to an ever-growing number of constantly changing regulations, in various jurisdictions, applicable to each transaction or activity. For cross-border activities that fall subject to multiple jurisdictions, firms must navigate an even higher degree of complexity to ensure compliance with the correct guidelines. Furthermore, firms not only need to achieve compliance but also need the ability to optimize among all compliant options to achieve optimal business outcome and client service, while doing so rigorously and efficiently, as financial institutions' operations become more digital and real-time, and increasing competition erodes business margin.

SUMMARY

In one aspect, disclosed herein are computer-implemented methods and techniques of regulatory exploration comprising: receiving a regulatory exploration request comprising a scenario consisting of a desired outcome; receiving an executable regulatory logic flow chart, wherein each element of the flow chart is associated with a regulatory text; applying algorithm to determine all paths in the regulatory logic flow chart; filtering the paths based on the desired outcome; transforming each remaining path into a logical expression comprising attributes; generating a query space comprising conditions on the input facts associated with each attribute; generating a fact space comprising input facts associated with each attribute; generating a possibility space by joining all the input facts in the fact space under all the conditions in the query space; converting the possibility space to a plurality of database queries; running the plurality of database queries; and generating an output. In some embodiments, the scenario further comprises a plurality of input facts. In further embodiments, the input facts are partial inputs, which incompletely describe the scenario and identify fact constraints. In some embodiments, the method further comprises providing data values for missing input facts in the fact space. In further embodiments, the data values for the missing input facts are provided by connecting to an external database to import data. In other embodiments, the data values for the missing input facts are provided by generating synthetic data. In yet other embodiments, the data values for the missing input facts are provided by connecting to an external database to import data and by generating synthetic data. In some embodiments, the desired outcome identifies one or more result constraints. In various embodiments, the elements of the flow chart are associated with a regulatory text by annotations, metadata, or both. In some embodiments, the algorithm comprises Depth-First Search (DFS). In some embodiments, each logical expression comprises a conjunction of conditions. In some embodiments, the output comprises an evaluation of all possibilities within the scenario for regulatory compliance. In some embodiments, the output comprises an audit record for the regulatory exploration. In further embodiments, the method further comprises enriching the audit record for the regulatory exploration with decision results for each database query of the plurality of database queries. In still further embodiments, the audit record comprises a plurality of decision paths for the regulatory exploration.

In another aspect, disclosed herein are computer-implemented platforms and/or systems comprising at least one processor and instructions executable to cause at least one processor to perform regulatory exploration operations comprising: receiving a regulatory exploration request comprising a scenario with a desired outcome; receiving an executable regulatory logic flow chart, wherein each element of the flow chart is associated with a regulatory text; applying algorithm to determine all paths in the regulatory logic flow chart; filtering the paths based on the desired outcome; transforming each remaining path into a logical expression comprising attributes; generating a query space comprising conditions on the input facts associated with each attribute; generating a fact space comprising input facts associated with each attribute; generating a possibility space by joining all the input facts in the fact space under all the conditions in the query space; converting the possibility space to a plurality of database queries; running the plurality of database queries; and generating an output. In some embodiments, the scenario comprises a plurality of input facts. In further embodiments, the input facts are partial inputs to describe the scenario and identify fact constraints. In some embodiments, the regulatory exploration operations further comprise providing data values for missing input facts in the fact space. In various further embodiments, the data values for the missing input facts are provided by connecting to an external database to import data, by generating synthetic data, or both. In some embodiments, the desired outcome identifies one or more result constraints. In various embodiments, the elements of the flow chart are associated with a regulatory text by annotations, metadata, or both. In a particular embodiment, the algorithm comprises Depth-First Search (DFS). In some embodiments, each logical expression comprises a conjunction of conditions. In some embodiments, the output comprises an evaluation of all possibilities within the scenario for regulatory compliance. In some embodiments, the output comprises an audit record for the regulatory exploration. In further embodiments, the regulatory exploration operations further comprise enriching the audit record for the regulatory exploration with decision results for each database query of the plurality of database queries. In further embodiments, the audit record comprises a plurality of decision paths for the regulatory exploration.

In another aspect, disclosed herein are one or more non-transitory computer-readable storage media encoded with instructions executable by one or more processors to provide a regulatory exploration application comprising: a software module receiving: a regulatory exploration request comprising a scenario comprising a desired outcome; and an executable regulatory logic flow chart, wherein each element of the flow chart is associated with a regulatory text; a software module applying algorithm to determine all paths in the regulatory logic flow chart; a software module filtering the paths based on the desired outcome; a software module transforming each remaining path into a logical expression comprising attributes; a software module generating: a query space comprising conditions on the input facts associated with each attribute; a fact space comprising input facts associated with each attribute; and a possibility space by joining all the input facts in the fact space under all the conditions in the query space; a software module converting the possibility space to a plurality of database queries; a software module running the plurality of database queries; and a software module generating an output based on the results of the queries. In some embodiments, the scenario comprises a plurality of input facts. In further embodiments, the input facts are partial inputs to describe the scenario and identify fact constraints. In some embodiments, the application further comprises a software module providing data values for missing input facts in the fact space. In various further embodiments, the data values for the missing input facts are provided by connecting to an external database to import data, by generating synthetic data, or both. In some embodiments, the desired outcome identifies one or more result constraints. In various embodiments, the elements of the flow chart are associated with a regulatory text by annotations, metadata, or both. In a particular embodiment, the algorithm comprises Depth-First Search (DFS). In some embodiments, each logical expression comprises a conjunction of conditions. In some embodiments, the output comprises an evaluation of all possibilities within the scenario for regulatory compliance. In some embodiments, the output comprises an audit record for the regulatory exploration. In further embodiments, the application further comprises a software module enriching the audit record for the regulatory exploration with decision results for each database query of the plurality of database queries. In further embodiments, the audit record comprises a plurality of decision paths for the regulatory exploration.

BRIEF DESCRIPTION OF THE DRAWINGS

A better understanding of the features and advantages of the present subject matter will be obtained by reference to the following detailed description that sets forth illustrative embodiments and the accompanying drawings of which:

FIG. 4 shows a non-limiting example of an exemplary process flow diagram; in this case, a process flow diagram for a regulatory exploration process described herein;

FIGS. 5A-5F show a non-limiting illustration of an exemplary process; in this case, an exemplary process for regulatory exploration applied to a financial trade scenario described herein; and FIGS. 6A-6C show a non-limiting example of a graphic user interface (GUI); in this case, a GUI for a regulatory exploration application described herein.

DETAILED DESCRIPTION

Figure 1:
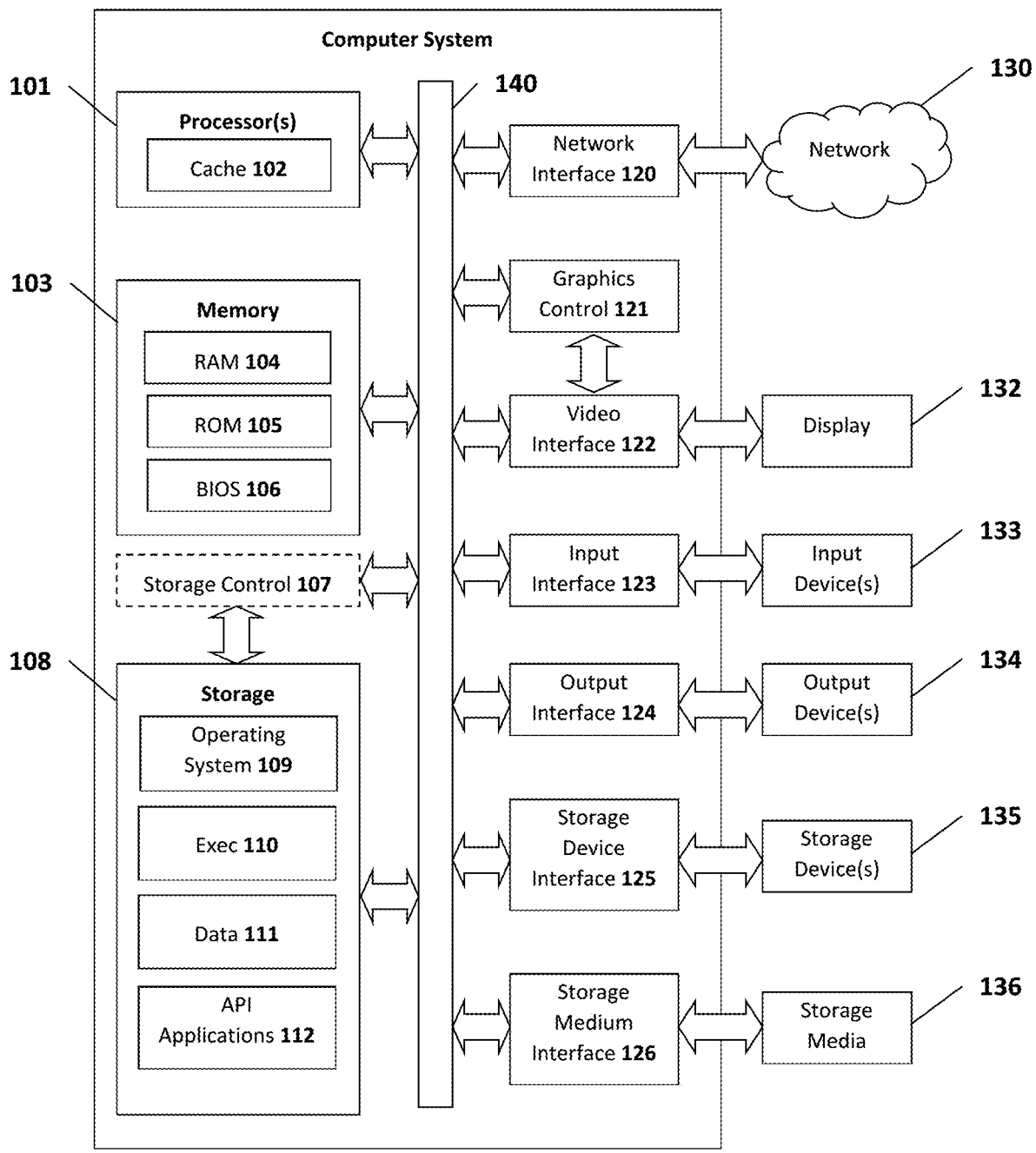
FIG. 1 shows a non-limiting example of a computing device; in this case, a device with one or more processors, memory, storage, and a network interface.

Described herein, in certain embodiments, are computer-implemented methods of regulatory exploration comprising: receiving a regulatory exploration request comprising a scenario comprising a desired outcome; receiving an executable regulatory logic flow chart, wherein each element of the flow chart is associated with a regulatory text; applying algorithm to determine all paths in the regulatory logic flow chart; filtering the paths based on the desired outcome; transforming each remaining path into a logical expression comprising attributes; generating a query space comprising conditions on the input facts associated with each attribute; generating a fact space comprising input facts associated with each attribute; generating a possibility space by joining all the input facts in the fact space under all the conditions in the query space; converting the possibility space to a plurality of database queries; running the plurality of database queries; and generating an output.

Also described herein, in certain embodiments, are computer-implemented platforms and/or systems comprising at least one processor and instructions executable to cause the at least one processor to perform regulatory exploration operations comprising: receiving a regulatory exploration request comprising a scenario comprising a desired outcome; receiving an executable regulatory logic flow chart, wherein each element of the flow chart is associated with a regulatory text; applying algorithm to determine all paths in the regulatory logic flow chart; filtering the paths based on the desired outcome; transforming each remaining path into a logical expression comprising attributes; generating a query space comprising conditions on the input facts associated with each attribute; generating a fact space comprising input facts associated with each attribute; generating a possibility space by joining all the input facts in the fact space under all the conditions in the query space; converting the possibility space to a plurality of database queries; running the plurality of database queries; and generating an output.

Also described herein, in certain embodiments, are one or more non-transitory computer-readable storage media encoded with instructions executable by one or more processors to provide a regulatory exploration application comprising: a software module receiving: a regulatory exploration request comprising a scenario comprising a desired outcome; and an executable regulatory logic flow chart, wherein each element of the flow chart is associated with a regulatory text; a software module applying algorithm to determine all paths in the regulatory logic flow chart; a software module filtering the paths based on the desired outcome; a software module transforming each remaining path into a logical expression comprising attributes; a software module generating: a query space comprising conditions on the input facts associated with each attribute; a fact space comprising input facts associated with each attribute; and a possibility space by joining all the input facts in the fact space under all the conditions in the query space; a software module converting the possibility space to a plurality of database queries; a software module running the plurality of database queries; and a software module generating an output based on the results of the queries.

Certain Definitions

Unless otherwise defined, all technical terms used herein have the same meaning as commonly understood by one of ordinary skill in the art to which the present subject matter belongs.

As used in this specification and the appended claims, the singular forms "a," "an," and "the" include plural references unless the context clearly dictates otherwise. Any reference to "or" herein is intended to encompass "and/or" unless otherwise stated.

Reference throughout this specification to "some embodiments," "further embodiments," or "a particular embodiment," means that a particular feature, structure, or characteristic described in connection with the embodiment is included in at least one embodiment. Thus, the appearances of the phrase "in some embodiments," or "in further embodiments," or "in a particular embodiment" in various places throughout this specification are not necessarily all referring to the same embodiment. Furthermore, the particular features, structures, or characteristics may be combined in any suitable manner in one or more embodiments.

Computing System

Referring to FIG. 1, a block diagram is shown depicting an exemplary machine that includes a computer system 100 (e.g., a processing or computing system) within which a set of instructions can execute for causing a device to perform or execute any one or more of the aspects and/or methodologies for static code scheduling of the present disclosure. The components in FIG. 1 are examples only and do not limit the scope of use or functionality of any hardware, software, embedded logic component, or a combination of two or more such components implementing particular embodiments.

Computer system 100 may include one or more processors 101, a memory 103, and a storage 108 that communicate with each other, and with other components, via a bus 140. The bus 140 may also link a display 132, one or more input devices 133 (which may, for example, include a keypad, a keyboard, a mouse, a stylus, etc.), one or more output devices 134, one or more storage devices 135, and various tangible storage media 136. All of these elements may interface directly or via one or more interfaces or adaptors to the bus 140. For instance, the various tangible storage media 136 can interface with the bus 140 via storage medium interface 126. Computer system 100 may have any suitable physical form, including but not limited to one or more integrated circuits (ICs), printed circuit boards (PCBs), mobile handheld devices (such as mobile telephones or PDAs), laptop or notebook computers, distributed computer systems, computing grids, or servers.

Computer system 100 includes one or more processor(s) 101 (e.g., central processing units (CPUs), general purpose graphics processing units (GPGPUs), or quantum processing units (QPUs)) that carry out functions. Processor(s) 101 optionally contains a cache memory unit 102 for temporary local storage of instructions, data, or computer addresses. Processor(s) 101 are configured to assist in execution of computer readable instructions. Computer system 100 may provide functionality for the components depicted in FIG. 1 as a result of the processor(s) 101 executing non-transitory, processor-executable instructions embodied in one or more tangible computer-readable storage media, such as memory 103, storage 108, storage devices 135, and/or storage medium 136. The computer-readable media may store software that implements particular embodiments, and processor(s) 101 may execute the software. Memory 103 may read the software from one or more other computer-readable media (such as mass storage device(s) 135, 136) or from one or more other sources through a suitable interface, such as network interface 120. The software may cause processor(s) 101 to carry out one or more processes or one or more steps of one or more processes described or illustrated herein. Carrying out such processes or steps may include defining data structures stored in memory 103 and modifying the data structures as directed by the software.

The memory 103 may include various components (e.g., machine readable media) including, but not limited to, a random access memory component (e.g., RAM 104) (e.g., static RAM (SRAM), dynamic RAM (DRAM), ferroelectric random access memory (FRAM), phase-change random access memory (PRAM), etc.), a read-only memory component (e.g., ROM 105), and any combinations thereof. ROM 105 may act to communicate data and instructions unidirectionally to processor(s) 101, and RAM 104 may act to communicate data and instructions bidirectionally with processor(s) 101. ROM 105 and RAM 104 may include any suitable tangible computer-readable media described below. In one example, a basic input/output system 106 (BIOS), including basic routines that help to transfer information between elements within computer system 100, such as during start-up, may be stored in the memory 103.

Fixed storage 108 is connected bidirectionally to processor(s) 101, optionally through storage control unit 107. Fixed storage 108 provides additional data storage capacity and may also include any suitable tangible computer-readable media described herein. Storage 108 may be used to store operating system 109, executable(s) 110, data 111, applications 112 (application programs), and the like. Storage 108 can also include an optical disk drive, a solid-state memory device (e.g., flash-based systems), or a combination of any of the above. Information in storage 108 may, in appropriate cases, be incorporated as virtual memory in memory 103.

In one example, storage device(s) 135 may be removably interfaced with computer system 100 (e.g., via an external port connector (not shown)) via a storage device interface 125. Particularly, storage device(s) 135 and an associated machine-readable medium may provide non-volatile and/or volatile storage of machine-readable instructions, data structures, program modules, and/or other data for the computer system 100. In one example, software may reside, completely or partially, within a machine-readable medium on storage device(s) 135. In another example, software may reside, completely or partially, within processor(s) 101.

Bus 140 connects a wide variety of subsystems. Herein, reference to a bus may encompass one or more digital signal lines serving a common function, where appropriate. Bus 140 may be any of several types of bus structures including, but not limited to, a memory bus, a memory controller, a peripheral bus, a local bus, and any combinations thereof, using any of a variety of bus architectures. As an example and not by way of limitation, such architectures include an Industry Standard Architecture (ISA) bus, an Enhanced ISA (EISA) bus, a Micro Channel Architecture (MCA) bus, a Video Electronics Standards Association local bus (VLB), a Peripheral Component Interconnect (PCI) bus, a PCI-Express (PCI-X) bus, an Accelerated Graphics Port (AGP) bus, HyperTransport (HTX) bus, serial advanced technology attachment (SATA) bus, and any combinations thereof.

Computer system 100 may also include an input device 133. In one example, a user of computer system 100 may enter commands and/or other information into computer system 100 via input device(s) 133. Examples of an input device(s) 133 include, but are not limited to, an alphanumeric input device (e.g., a keyboard), a pointing device (e.g., a mouse or touchpad), a touchpad, a touch screen, a multi-touch screen, a joystick, a stylus, a gamepad, an audio input device (e.g., a microphone, a voice response system, etc.), an optical scanner, a video or still image capture device (e.g., a camera), and any combinations thereof. In some embodiments, the input device is a Kinect, Leap Motion, or the like. Input device(s) 133 may be interfaced to bus 140 via any of a variety of input interfaces 123 (e.g., input interface 123) including, but not limited to, serial, parallel, game port, USB, FIREWIRE, THUNDERBOLT, or any combination of the above.

In particular embodiments, when computer system 100 is connected to network 130, computer system 100 may communicate with other devices, specifically mobile devices and enterprise systems, distributed computing systems, cloud storage systems, cloud computing systems, and the like, connected to network 130. Communications to and from computer system 100 may be sent through network interface 120. For example, network interface 120 may receive incoming communications (such as requests or responses from other devices) in the form of one or more packets (such as Internet Protocol (IP) packets) from network 130, and computer system 100 may store the incoming communications in memory 103 for processing. Computer system 100 may similarly store outgoing communications (such as requests or responses to other devices) in the form of one or more packets in memory 103 and communicated to network 130 from network interface 120. Processor(s) 101 may access these communication packets stored in memory 103 for processing.

Examples of the network interface 120 include, but are not limited to, a network interface card, a modem, and any combination thereof. Examples of a network 130 or network segment 130 include, but are not limited to, a distributed computing system, a cloud computing system, a wide area network (WAN) (e.g., the Internet, an enterprise network), a local area network (LAN) (e.g., a network associated with an office, a building, a campus or other relatively small geographic space), a telephone network, a direct connection between two computing devices, a peer-to-peer network, and any combinations thereof. A network, such as network 130, may employ a wired and/or a wireless mode of communication. In general, any network topology may be used.

Information and data can be displayed through a display 132. Examples of a display 132 include, but are not limited to, a liquid crystal display (LCD), a thin film transistor liquid crystal display (TFT-LCD), an organic liquid crystal display (OLED) such as a passive-matrix OLED (PMOLED) or active-matrix OLED (AMOLED) display, a plasma display, and any combinations thereof. The display 132 can interface to the processor(s) 101, memory 103, and fixed storage 108, as well as other devices, such as input device(s) 133, via the bus 140. The display 132 is linked to the bus 140 via a video interface 122, and transport of data between the display 132 and the bus 140 can be controlled via the graphics control 121. In some embodiments, the display is a video projector. In some embodiments, the display is a head-mounted display (TIMID) such as a VR headset. In further embodiments, suitable VR headsets include, by way of non-limiting examples, HTC Vive, Oculus Rift, Samsung Gear VR, Microsoft HoloLens, Razer OSVR, FOVE VR, Zeiss VR One, Avegant Glyph, Freefly VR headset, and the like. In still further embodiments, the display is a combination of devices such as those disclosed herein.

In addition to a display 132, computer system 100 may include one or more other peripheral output devices 134 including, but not limited to, an audio speaker, a printer, a storage device, and any combinations thereof. Such peripheral output devices may be connected to the bus 140 via an output interface 124. Examples of an output interface 124 include, but are not limited to, a serial port, a parallel connection, a USB port, a FIREWIRE port, a THUNDERBOLT port, and any combinations thereof.

In addition or as an alternative, computer system 100 may provide functionality as a result of logic hardwired or otherwise embodied in a circuit, which may operate in place of or together with software to execute one or more processes or one or more steps of one or more processes described or illustrated herein. Reference to software in this disclosure may encompass logic, and reference to logic may encompass software. Moreover, reference to a computer-readable medium may encompass a circuit (such as an IC) storing software for execution, a circuit embodying logic for execution, or both, where appropriate. The present disclosure encompasses any suitable combination of hardware, software, or both.

Those of skill in the art will appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by one or more processor(s), or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In accordance with the description herein, suitable computing devices include, by way of non-limiting examples, cloud computing platforms, distributed computing platforms, server clusters, server computers, desktop computers, laptop computers, notebook computers, sub-notebook computers, netbook computers, netpad computers, set-top computers, media streaming devices, handheld computers, Internet appliances, mobile smartphones, tablet computers, personal digital assistants, and vehicles. Those of skill in the art will also recognize that select televisions, video players, and digital music players with optional computer network connectivity are suitable for use in the system described herein. Suitable tablet computers, in various embodiments, include those with booklet, slate, and convertible configurations, known to those of skill in the art.

In some embodiments, the computing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX-like operating systems such as GNU/Linux®. In some embodiments, the operating system is provided by cloud computing. Those of skill in the art will also recognize that suitable mobile smartphone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

Non-Transitory Computer Readable Storage Medium

In some embodiments, the platforms, systems, media, and methods disclosed herein include one or more non-transitory computer readable storage media encoded with a program including instructions executable by the operating system of an optionally networked computing device. In further embodiments, a computer readable storage medium is a tangible component of a computing device. In still further embodiments, a computer readable storage medium is optionally removable from a computing device. In some embodiments, a computer readable storage medium includes, by way of non-limiting examples, CD-ROMs, DVDs, flash memory devices, solid state memory, magnetic disk drives, magnetic tape drives, optical disk drives, distributed computing systems including cloud computing systems and services, and the like. In some cases, the program and instructions are permanently, substantially permanently, semi-permanently, or non-transitorily encoded on the media.

Computer Program

In some embodiments, the platforms, systems, media, and methods disclosed herein include at least one computer program, or use of the same. A computer program includes a sequence of instructions, executable by one or more processor(s) of the computing device's CPU, written to perform a specified task. Computer readable instructions may be implemented as program modules, such as functions, objects, Application Programming Interfaces (APIs), computing data structures, and the like, which perform particular tasks or implement particular abstract data types. In light of the disclosure provided herein, those of skill in the art will recognize that a computer program may be written in various versions of various languages.

The functionality of the computer readable instructions may be combined or distributed as desired in various environments. In some embodiments, a computer program comprises one sequence of instructions. In some embodiments, a computer program comprises a plurality of sequences of instructions. In some embodiments, a computer program is provided from one location. In other embodiments, a computer program is provided from a plurality of locations. In various embodiments, a computer program includes one or more software modules. In various embodiments, a computer program includes, in part or in whole, one or more web applications, one or more mobile applications, one or more standalone applications, one or more web browser plug-ins, extensions, add-ins, or add-ons, or combinations thereof.

Web Application

In some embodiments, a computer program includes a web application. In light of the disclosure provided herein, those of skill in the art will recognize that a web application, in various embodiments, utilizes one or more software frameworks and one or more database systems. In some embodiments, a web application is created upon a software framework such as Microsoft® .NET or Ruby on Rails (RoR). In some embodiments, a web application utilizes one or more database systems including, by way of non-limiting examples, relational, non-relational, object oriented, associative, XML, and document oriented database systems. In further embodiments, suitable relational database systems include, by way of non-limiting examples, Microsoft® SQL Server, mySQL™, and Oracle®. Those of skill in the art will also recognize that a web application, in various embodiments, is written in one or more versions of one or more languages. A web application may be written in one or more markup languages, presentation definition languages, client-side scripting languages, server-side coding languages, database query languages, or combinations thereof. In some embodiments, a web application is written to some extent in a markup language such as Hypertext Markup Language (HTML), Extensible Hypertext Markup Language (XHTML), or eXtensible Markup Language (XML). In some embodiments, a web application is written to some extent in a presentation definition language such as Cascading Style Sheets (CSS). In some embodiments, a web application is written to some extent in a client-side scripting language such as Asynchronous JavaScript and XML (AJAX), Flash® ActionScript, JavaScript, or Silverlight®. In some embodiments, a web application is written to some extent in a server-side coding language such as Active Server Pages (ASP), ColdFusion®, Perl, Java™, JavaServer Pages (JSP), Hypertext Preprocessor (PUP), Python™, Ruby, Tcl, Smalltalk, WebDNA®, or Groovy. In some embodiments, a web application is written to some extent in a database query language such as Structured Query Language (SQL). In some embodiments, a web application integrates enterprise server products such as IBM® Lotus Domino®. In some embodiments, a web application includes a media player element. In various further embodiments, a media player element utilizes one or more of many suitable multimedia technologies including, by way of non-limiting examples, Adobe® Flash®, HTML 5, Apple® QuickTime®, Microsoft® Silverlight®, Java™, and Unity®.

Figure 2:
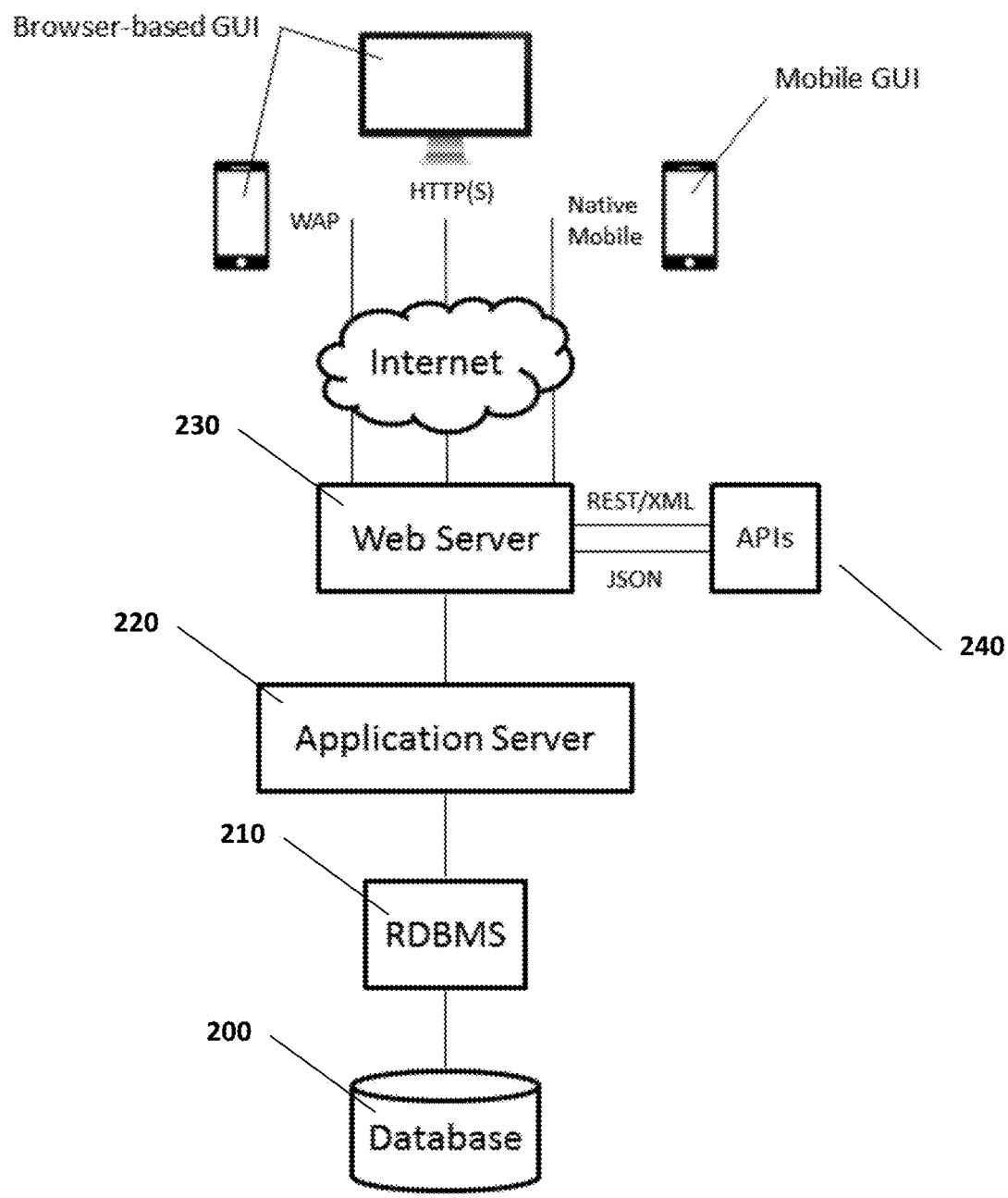
FIG. 2 shows a non-limiting example of a web/mobile application provision system; in this case, a system providing browser-based and/or native mobile user interfaces.

Referring to FIG. 2, in a particular embodiment, an application provision system comprises one or more databases 200 accessed by a relational database management system (RDBMS) 210. Suitable RDBMSs include Firebird, MySQL, PostgreSQL, SQLite, Oracle Database, Microsoft SQL Server, IBM DB2, IBM Informix, SAP Sybase, Teradata, and the like. In this embodiment, the application provision system further comprises one or more application severs 220 (such as Java servers, .NET servers, PUP servers, and the like) and one or more web servers 230 (such as Apache, IIS, GWS and the like). The web server(s) optionally expose one or more web services via app application programming interfaces (APIs) 240. Via a network, such as the Internet, the system provides browser-based and/or mobile native user interfaces.

Figure 3:
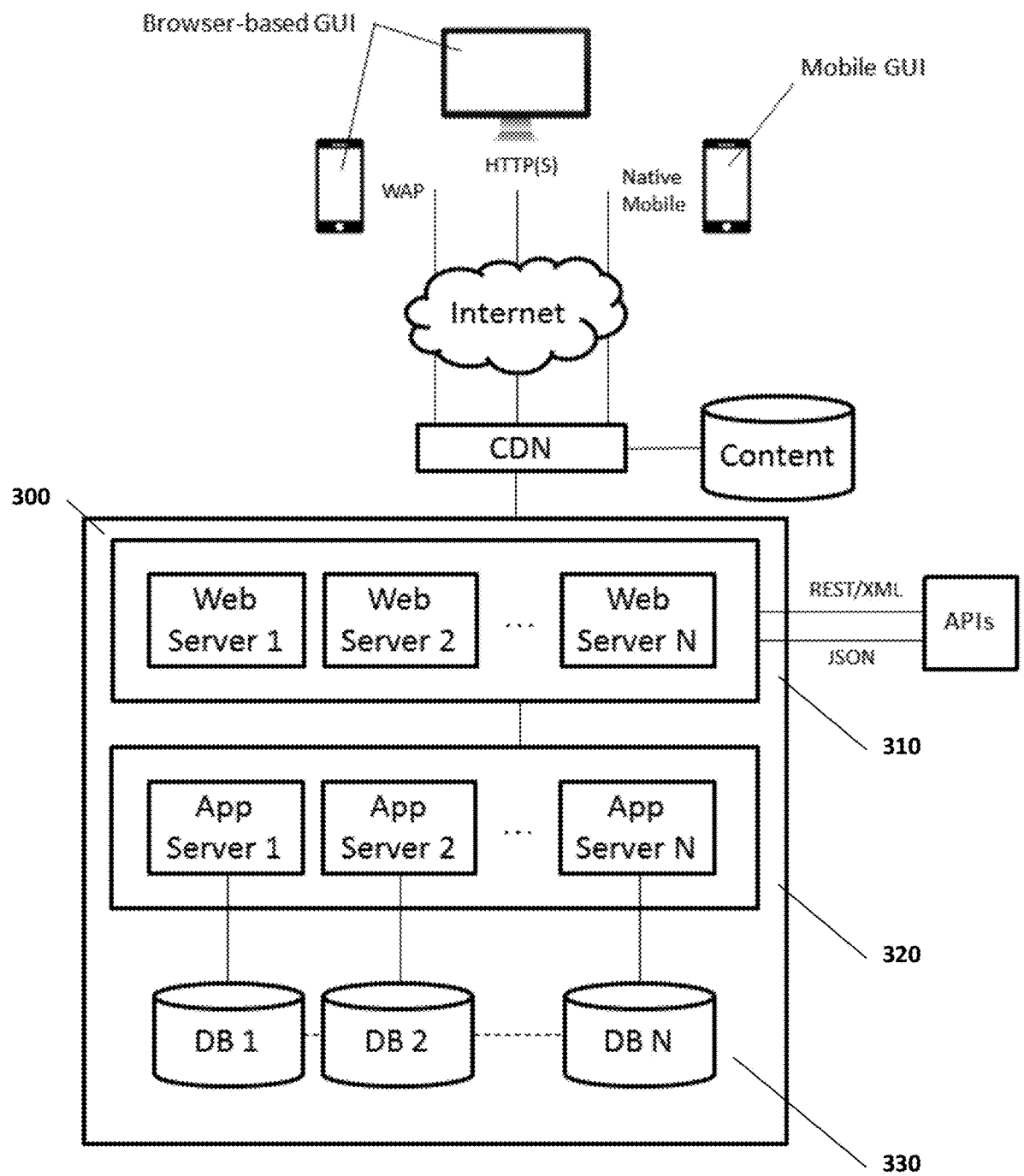
FIG. 3 shows a non-limiting example of a cloud-based web/mobile application provision system; in this case, a system comprising an elastically load balanced, auto-scaling web server and application server resources as well synchronously replicated databases.

Referring to FIG. 3, in a particular embodiment, an application provision system alternatively has a distributed, cloud-based architecture 300 and comprises elastically load balanced, auto-scaling web server resources 310 and application server resources 320 as well synchronously replicated databases 330.

Mobile Application

In some embodiments, a computer program includes a mobile application provided to a mobile computing device. In some embodiments, the mobile application is provided to a mobile computing device at the time it is manufactured. In other embodiments, the mobile application is provided to a mobile computing device via the computer network described herein.

In view of the disclosure provided herein, a mobile application is created by techniques known to those of skill in the art using hardware, languages, and development environments known to the art. Those of skill in the art will recognize that mobile applications are written in several languages. Suitable programming languages include, by way of non-limiting examples, C, C++, C#, Objective-C, Java™, JavaScript, Pascal, Object Pascal, Python™, Ruby, VB.NET, WML, and XHTML/HTML with or without CSS, or combinations thereof.

Suitable mobile application development environments are available from several sources. Commercially available development environments include, by way of non-limiting examples, AirplaySDK, alcheMo, Appcelerator®, Celsius, Bedrock, Flash Lite, NET Compact Framework, Rhomobile, and WorkLight Mobile Platform. Other development environments are available without cost including, by way of non-limiting examples, Lazarus, MobiFlex, MoSync, and PhoneGap. Also, mobile device manufacturers distribute software developer kits including, by way of non-limiting examples, iPhone and iPad (iOS) SDK, Android™ SDK, BlackBerry® SDK, BREW SDK, Palm® OS SDK, Symbian SDK, webOS SDK, and Windows® Mobile SDK.

Standalone Application

In some embodiments, a computer program includes a standalone application, which is a program that is run as an independent computer process, not an add-on to an existing process, e.g., not a plug-in. Those of skill in the art will recognize that standalone applications are often compiled. A compiler is a computer program(s) that transforms source code written in a programming language into binary object code such as assembly language or machine code. Suitable compiled programming languages include, by way of non-limiting examples, C, C++, Objective-C, COBOL, Delphi, Eiffel, Java™, Lisp, Python™, Visual Basic, and VB .NET, or combinations thereof. Compilation is often performed, at least in part, to create an executable program. In some embodiments, a computer program includes one or more executable complied applications.

Web Browser Plug-In

In some embodiments, the computer program includes a web browser plug-in (e.g., extension, etc.). In computing, a plug-in is one or more software components that add specific functionality to a larger software application. Makers of software applications support plug-ins to enable third-party developers to create abilities which extend an application, to support easily adding new features, and to reduce the size of an application. When supported, plug-ins enable customizing the functionality of a software application. For example, plug-ins are commonly used in web browsers to play video, generate interactivity, scan for viruses, and display particular file types. Those of skill in the art will be familiar with several web browser plug-ins including, Adobe® Flash® Player, Microsoft® Silverlight®, and Apple® QuickTime®. In some embodiments, the toolbar comprises one or more web browser extensions, add-ins, or add-ons. In some embodiments, the toolbar comprises one or more explorer bars, tool bands, or desk bands.

In view of the disclosure provided herein, those of skill in the art will recognize that several plug-in frameworks are available that enable development of plug-ins in various programming languages, including, by way of non-limiting examples, C++, Delphi, Java™, PHP, Python™, and VB .NET, or combinations thereof.

Web browsers (also called Internet browsers) are software applications, designed for use with network-connected computing devices, for retrieving, presenting, and traversing information resources on the World Wide Web. Suitable web browsers include, by way of non-limiting examples, Microsoft® Internet Explorer®, Mozilla® Firefox®, Google® Chrome, Apple® Safari®, Opera Software® Opera®, and KDE Konqueror. In some embodiments, the web browser is a mobile web browser. Mobile web browsers (also called microbrowsers, mini-browsers, and wireless browsers) are designed for use on mobile computing devices including, by way of non-limiting examples, handheld computers, tablet computers, netbook computers, subnotebook computers, smartphones, music players, personal digital assistants (PDAs), and handheld video game systems. Suitable mobile web browsers include, by way of non-limiting examples, Google® Android® browser, RIM BlackBerry® Browser, Apple® Safari®, Palm® Blazer, Palm® WebOS® Browser, Mozilla® Firefox® for mobile, Microsoft® Internet Explorer® Mobile, Amazon® Kindle® Basic Web, Nokia® Browser, Opera Software® Opera® Mobile, and Sony® PSP™ browser.

Software Modules

In some embodiments, the platforms, systems, media, and methods disclosed herein include software, server, and/or database modules, or use of the same. In view of the disclosure provided herein, software modules are created by techniques known to those of skill in the art using machines, software, and languages known to the art. The software modules disclosed herein are implemented in a multitude of ways. In various embodiments, a software module comprises a file, a section of code, a programming object, a programming structure, a distributed computing resource, a cloud computing resource, or combinations thereof. In further various embodiments, a software module comprises a plurality of files, a plurality of sections of code, a plurality of programming objects, a plurality of programming structures, a plurality of distributed computing resources, a plurality of cloud computing resources, or combinations thereof. In various embodiments, the one or more software modules comprise, by way of non-limiting examples, a web application, a mobile application, a standalone application, and a distributed or cloud computing application. In some embodiments, software modules are in one computer program or application. In other embodiments, software modules are in more than one computer program or application. In some embodiments, software modules are hosted on one machine. In other embodiments, software modules are hosted on more than one machine. In further embodiments, software modules are hosted on a distributed computing platform such as a cloud computing platform. In some embodiments, software modules are hosted on one or more machines in one location. In other embodiments, software modules are hosted on one or more machines in more than one location.

Databases

In some embodiments, the platforms, systems, media, and methods disclosed herein include one or more databases, or use of the same. In view of the disclosure provided herein, those of skill in the art will recognize that many databases are suitable for storage and retrieval of, for example, regulatory exploration request, input fact, logic flow chart, algorithm, logical expression, attribute, query space, fact space, possibility space, output, and audit trail information. In various embodiments, suitable databases include, by way of non-limiting examples, relational databases, non-relational databases, object oriented databases, object databases, entity-relationship model databases, associative databases, XML databases, document oriented databases, and graph databases. Further non-limiting examples include SQL, PostgreSQL, MySQL, Oracle, DB2, Sybase, and MongoDB. In some embodiments, a database is Internet-based. In further embodiments, a database is web-based. In still further embodiments, a database is cloud computing-based. In a particular embodiment, a database is a distributed database. In other embodiments, a database is based on one or more local computer storage devices.

Regulatory Exploration Overview

The subject matter described herein utilizes, builds upon, and offers improvements to the methods, systems, and media for resolving legal or regulatory inquires and generating audit records, including the executable logical models, described in U.S. Pat. No. 10,509,813. Accordingly, U.S. Pat. No. 10,509,813, entitled "SYSTEM AND METHOD FOR ANALYZING AND MODELING CONTENT," and issued Dec. 17, 2019, is incorporated herein by reference in its entirety.

The subject matter provided herein offers improvements over existing technologies, including, but not limited to, creating opportunities to explore a possibility space efficiently, while being able to scale to support large datasets. For example, the regulatory explorations enabled push the envelope from "Can we Y with this X?" to "Which of the Xs can we Y with?" Other improvements over existing technologies offered by various embodiments, include, by way of non-limiting examples:

1) Allowing provision of partial input to the system, wherein the space of "completions" of that input that reach a specified in/out of scope decision of that input can be dynamically explored;
2) All such completions are traced back to the original regulatory text or policy documentation explaining the legal and/or policy basis for the completion reaching the requested decision;
3) Audit records are produced both for the individual completions and the original query, providing a paper trail for compliance/surveillance;
4) Similarly, input requirements for a particular regulatory obligation can be relativized to those that are needed given a specific partial scenario, for example, transacting in a particular asset class or with a counterparty with particular characteristics. In some embodiments, this is achieved through "folding" of the logical models derived from aggregated and parsed text;
5) Utilizing these features in combination with traceability to the digitized regulatory and/or policy text allows the communication of the relativization of regulatory text to partially specified scenarios;
6) Visualization of decision trees can similarly be "folded" to produce relativized renderings of the applicable logic given a partial scenario, facilitating simplified observations of the regulatory burden and/or change associated with key scenarios; and
7) Similar relativization is also achieved in the validation of regulatory data. For example, input requirements can be returned relative to a particular partial sample of the reportable regulatory data, as well as the relativized scope of validation rules that must be applied in this scenario.

Referring to FIG. 4, in some embodiments, these improvements are achieved, at least in part, by a methodology 400 comprising a series of computer-implemented steps. The fundamental idea of the methodology 400 is, given a scenario comprising partial input (fact constraints) and desired output (result constraints), to find all possible input facts by discovering all matching decision paths, converting the logic to SQL queries, and running the SQL queries to conduct a regulatory exploration of the scenario.

Continuing to refer to FIG. 4, in some embodiments, this exemplary methodology starts with a logic model, derived from regulatory text, describing the regulations governing a scenario. In this embodiment, first, the system collects all paths through the logical model, e.g., decision tree 402. Next, according to the embodiment of FIG. 4, for each path through the logical model, e.g., decision tree, the system conjoins all expressions using logical ANDs 404. Then, in this example, for each attribute on each path, the system JOINs in a table of possible values 406. In this embodiment, the next step is to produce SELECTs for each path using the AND expressions in WHERE against the JOIN-ed tables 408. Finally, this exemplary methodology culminates in running all the SELECTs 410.

As can be appreciated by those of skill in the relevant field, the described scenario driven exploration of digitized regulatory text backed by executable decision logic, facilitates open-ended computational queries about what extensions to scenarios are, and are not, mandated or permitted, while scaling to support large datasets without compromising computing performance or bandwidth. The system is relativized to a particular partial scenario, from input requirements through to digitized text and even visualization.

Exemplary Implementation

Figure 5E:
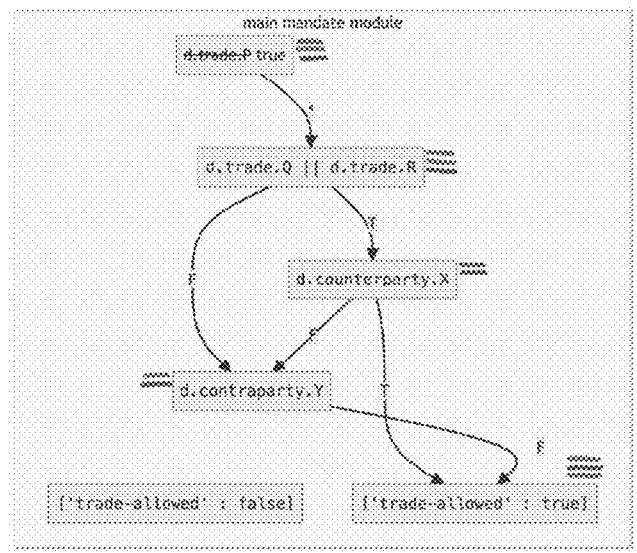

FIGS. 5A-5F, show how the described methodology, is in some embodiments, technically implemented. Referring to FIG. 5A, in a particular embodiment, a single module is first considered. Referring to FIG. 5B, in this particular embodiment, first, a partial input is applied to file the constraints, in this case, "trade.P=true." Referring to FIG. 5C, in this embodiment, next, the paths are filtered based on the output filter "trade-allowed=true." Referring to FIG. 5D, in this embodiment, all the remaining paths are collected from the module. Referring to FIG. 5E, in this embodiment, each path is a conjunction of conditions, which are converted to a database language, such as Structured Query Language (SQL). The final step, in this embodiment, is to determine from where to do the SELECTs FROM.

To build the fact space, the system collects "missing attributes" that remain on each path. For example, using the embodiment of FIGS. 5A-5F:

SELECT * FROM . . . WHERE (NOT ("trade.Q" OR "trade.R")) AND NOT "contraparty.Y"

SELECT * FROM . . . WHERE ("trade.Q" OR "trade.R") AND "counterparty.X"

SELECT * FROM . . . WHERE ("trade.Q" OR "trade.R") AND NOT "counterparty.X" AND "contraparty.Y"

Figure 5F:
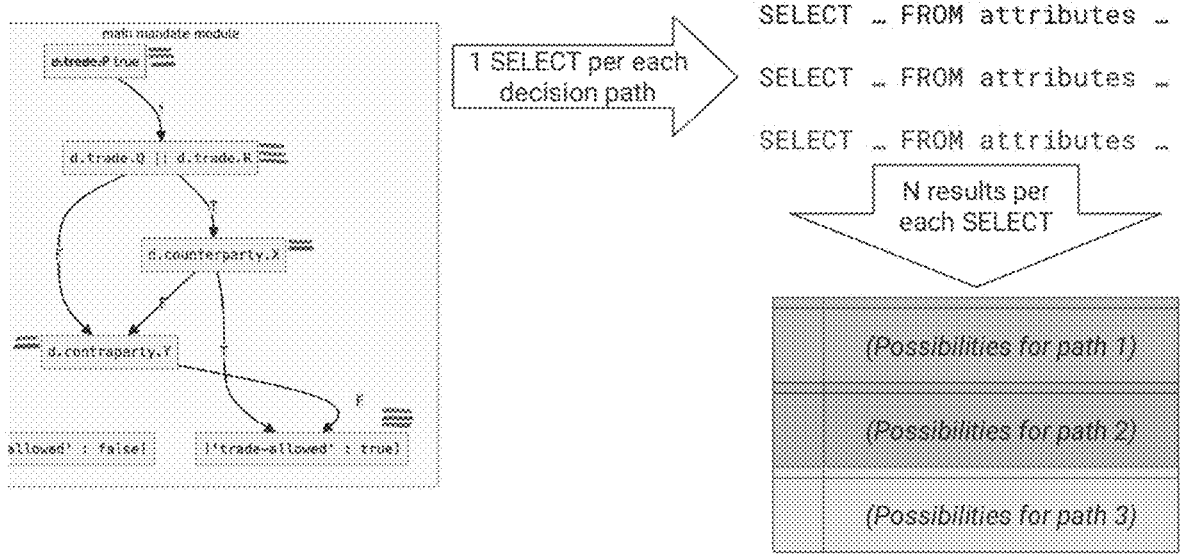

Next, in this example, the system generates temporary tables or plugs external dataset with values for each missing attribute. Finally, according to this example, the system CROSS JOINs these tables and use the result in the FROM.

Where synthetic data is used to fill in gaps, e.g., without external data, attribute types are used to understand which values to enumerate in fact space tables, For example:

CREATE TABLE pg_temp."G_2_input.trade.A" ("input.trade.A" boolean, PRIMARY KEY ("input.trade.A"))
INSERT INTO pg_temp."G_2_input.trade.A" ("input.trade.A") VALUES (true),(false)
CREATE TABLE pg_temp."G_3_input.trade.B" ("input.trade.B" text[ ], PRIMARY KEY ("input.trade.B"))
INSERT INTO pg_temp."G_3_input.trade.B" ("input.trade.B") VALUES (ARRAY['GWM', 'IB']),(ARRAY['GWM']),(ARRAY['IB'])
WITH attributes AS (SELECT * FROM (
SELECT "input.trade.A" FROM pg_temp."G_2_input.trade.A") s0 CROSS JOIN
(SELECT "input.trade.B" FROM pg_temp."G_3_input.trade.B") s1 CROSS JOIN
(SELECT "input.trade.C" FROM pg_temp."G_4_input.trade.C") s2)
SELECT * FROM attributes
WHERE ('Val1'=ANY (attributes. "input.trade.B"))
AND NOT (attributes. "input.trade.A")
AND (attributes. "input.trade.C"='C');

By way of further example, where external data tables are mapped:

WITH attributes AS (SELECT * FROM (
SELECT
"A" AS "input.trade.A",
"B" AS "input.trade.B",
"C" AS "input.trade.C",
"clientID" AS "datasets.clients_v2.clientID",
"clientName" AS "datasets.clients_v2.clientName"
FROM
"clients_v2") s0
)
SELECT * FROM attributes
WHERE ('Val1'=ANY (attributes. "input.trade.B"))
AND NOT (attributes. "input.trade.A")
AND (attributes. "input.trade.C"='C');

Referring to FIG. 5F, in this embodiment, the response is next formed. One SELECT per each decision path, with N results per each SELECT. Two points should be noted from this example. First, each decision path can be used to generate an example output using any possibility found for the path, among N produced via each SELECT. Second, each decision path forms a description of the audit record for the corresponding SELECT, so for each of the N results from this SELECT, we can use the decision path from which the SELECT was generated as a decision path audit record (this is represented by the colors (shades) of FIG. 5F). Using the described methodology, one can capture an audit record for N results from _each select_ at once (rather than capturing a decision record for _each of N possibilities from each SELECT_). For example, if an exploration ends up with 3 SELECTs produced from 3 decision paths, and each SELECT results in N=100 possibilities, with the described methodology we could preserve just 3 decision path audit records, rather than 300 (3×100), which preserves bandwidth and improves computing performance.

Exemplary User Interface

Figure 6A:
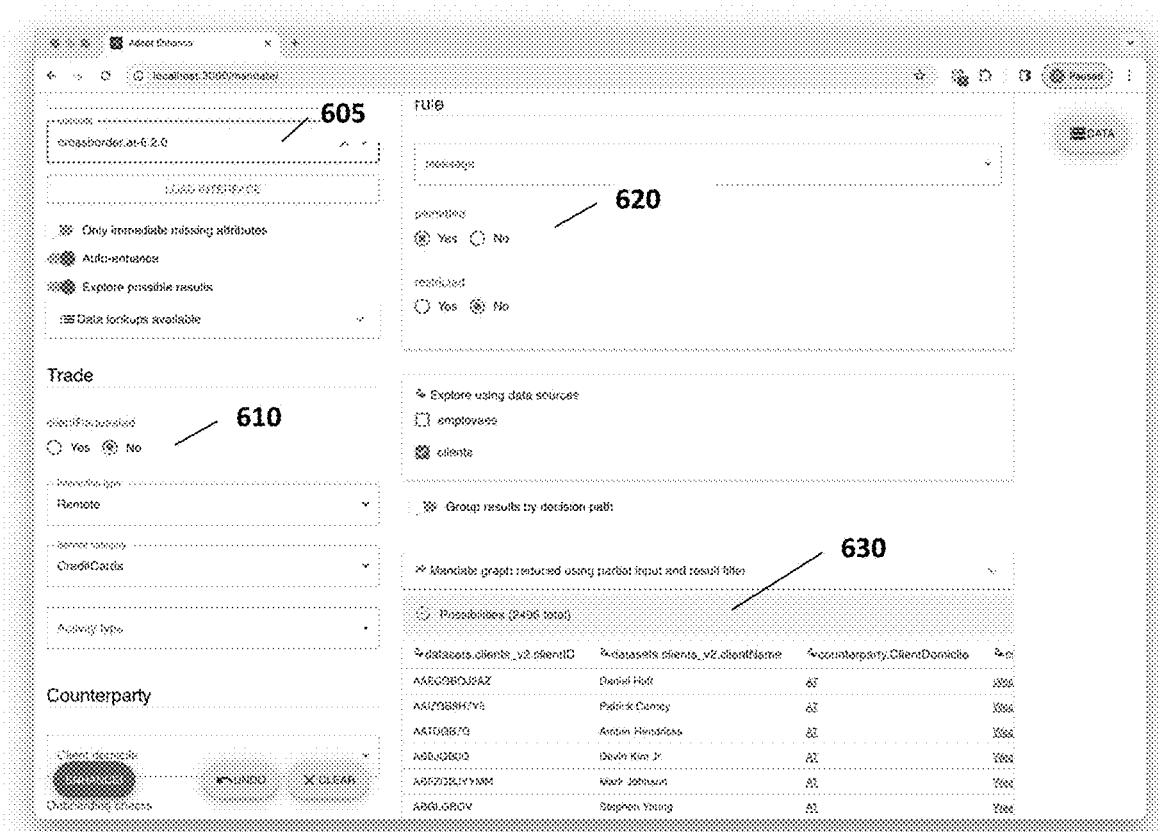
Figure 6B:
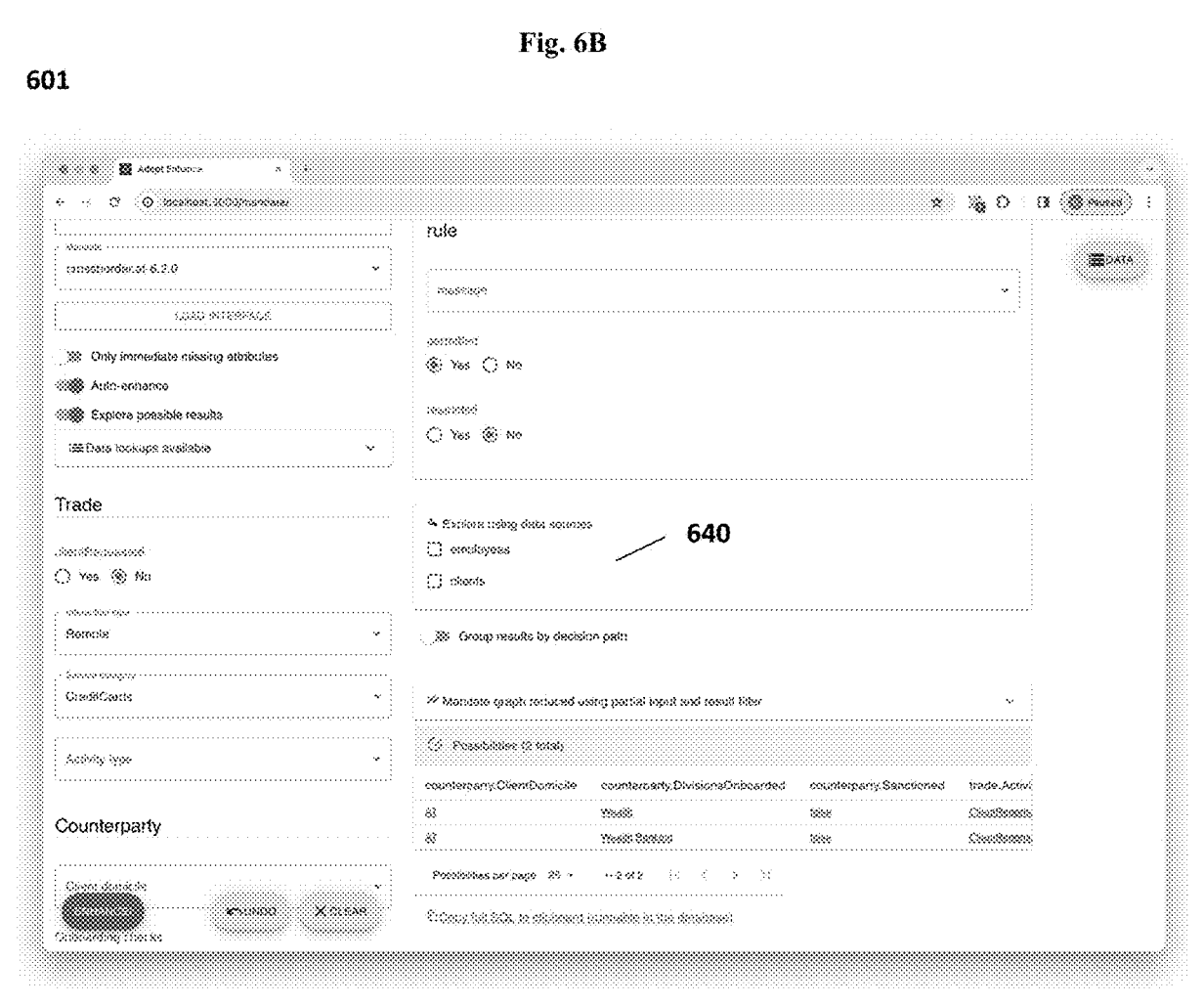
Figure 6C:
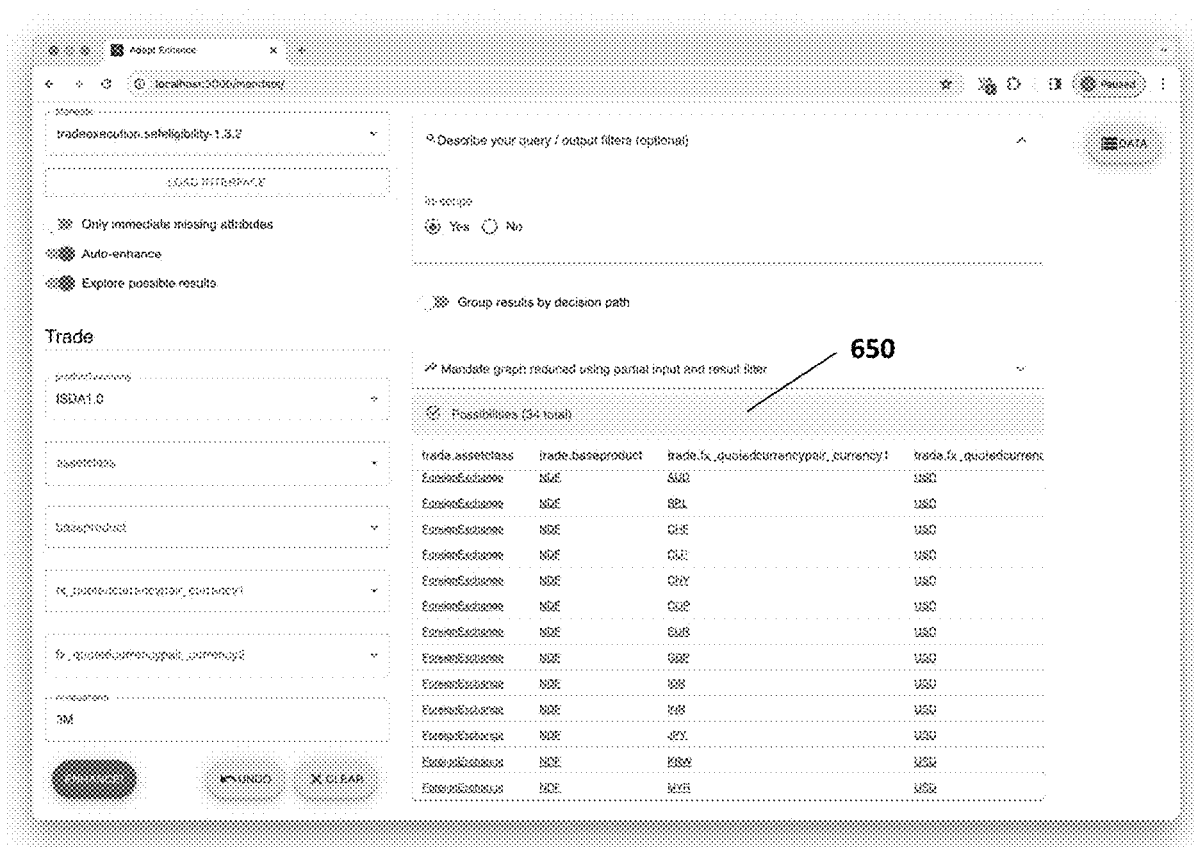

Referring to FIGS. 6A-6C, in some embodiments, a GUI 600, 601, 602 is provided allowing a user to interact with the subject matter described herein. As shown, in FIG. 6A, an exemplary GUI 600 includes elements allowing a user to specify one or more regulatory mandates 605. This exemplary GUI 600 also includes elements allowing a user to describe a trade 610 by (optionally) entering partial input facts, e.g., what is presently known about the proposed trade, including, by way of examples, interaction type, service category, activity type, and counterparty information. The exemplary GUI of FIG. 6A also includes elements allowing a user to describe desired decisions 620 by (optionally) entering one or more query and/or output filters, e.g., what is the desired outcome, such as, by way of examples, if the trade is permitted and/or if the trade is restricted. Also, in this example, the GUI 600 includes all of the combinations of remaining facts along each matching decision path that satisfy the constraints 630. As shown, in FIG. 6B, by default, synthetic values for "gaps" are generated and the exemplary GUI 601 includes tools for mapping a data source (a database table) onto mandate attributes 640. This allows the system to constrain the search space and connect it to external data (such as, for example, a database of clients). Also, as shown, in FIG. 6C, when a data source is used, missing facts are filled in using matching rows of the corresponding table, and the GUI 602 also shows any extra fields 650.

EXAMPLES

The following illustrative examples are representative of embodiments of the software applications, systems, and methods described herein and are not meant to be limiting in any way.

Example 1—Select Derivatives Counterparty Account with which to Transact

A registered representative of an investment bank, e.g. a derivatives salesperson, needs to transact a derivative as part of the trading desk's routine risk management practice. A typical large investment bank may have hundreds of thousands of counterparty accounts in total. The salesperson needs to determine with which counterparty accounts the derivative can be executed and how to do so compliantly. Depending on certain characteristics of a given counterparty account, e.g. the legal domicile and parent entity, its regulatory classification, risk tiering, etc., different regulations and a firm's own policies may apply, in some cases stipulating that a given counterparty account is ineligible for transacting a specific derivatives structure. In addition, each client's relationship documentation may specify additional restrictions, e.g. maximum notional amounts for different types of derivatives transactions. To identify the eligible counterparty accounts with which the transaction may be executed compliantly, the salesperson may input relevant parameters of the derivative into the application and direct the application to compute all eligible counterparties and required transaction characteristics. The system makes use of counterparty reference data made available through a reference data ingestion mechanism, applies the regulatory logic expressed using the proprietary language, and is able to provide a list of counterparties with whom the transaction may be executed and any additional restrictions for each possible transaction, e.g. that the derivative must be cleared at specific clearing houses and must have a time to maturity of 5 years, 10 years, or 20 years.

Example 2—Service Wealth Management Clients

A wealth advisor at a wealth management firm is preparing to meet a client in another country and would like to identify a list of investment products to discuss at the meeting. Whether the advisor can discuss a product with a client is governed by various regulations as well as the firm's policies. Since the wealth advisor and the wealth management firm's home jurisdiction differ from the client's legal domicile and the meeting location, and each investment product may have its own set of jurisdictions in which it's registered or permitted for marketing or distribution, what the wealth advisor is permitted to discuss or offer is governed by a set of complex regulations and policies. Furthermore, the client has his/her own investment objectives and preferences, risk tolerance levels, and other factors that are specified in the relevant relationship documentation or otherwise expressed to the advisor. These additional restrictions must also be taken into account. The advisor may enter into the application relevant details about the upcoming meeting, e.g. where it's to take place, and some characteristics of the investment products, if known. The system makes use of the ingested reference data capturing details regarding the client, the advisor, and all available investment products and applies the regulatory and policy logic expressed in the proprietary language to determine the list of eligible products and any additional characteristics or restrictions associated with each, e.g. the product may only be discussed should the client initiate an enquiry into its details.

While preferred embodiments of the present subject matter have been shown and described herein, it will be obvious to those skilled in the art that such embodiments are provided by way of example only. Numerous variations, changes, and substitutions will now occur to those skilled in the art without departing from the present subject matter. It should be understood that various alternatives to the embodiments of the present subject matter described herein may be employed in practicing the present subject matter.

What is claimed is:

1. A computer-implemented method of regulatory exploration comprising:
   a) receiving a regulatory exploration request comprising a scenario comprising a plurality of input facts and a desired outcome of the scenario, wherein the plurality of input facts are partial inputs incompletely identifying fact constraints of the scenario, and wherein the desired outcome of the scenario identifies one or more result constraints;
   b) receiving an executable regulatory logic flow chart, wherein each element of the flow chart is associated with a regulatory text;
   c) applying an algorithm to determine all paths in the regulatory logic flow chart;
   d) filtering the paths based on the desired outcome of the scenario;
   e) transforming each remaining path into a logical expression comprising attributes;
   f) generating a query space comprising conditions on the input facts, from the plurality of input facts, associated with each attribute;
   g) generating a fact space comprising input facts, from the plurality of input facts, associated with each attribute;
   h) generating a possibility space by joining all the input facts in the fact space under all the conditions in the query space;
   i) converting the possibility space to a plurality of database queries;
   j) running the plurality of database queries; and
   k) generating an output comprising an evaluation of all possibilities within the scenario for regulatory compliance under the regulatory logic.

2. The method of claim 1, further comprising providing data values for missing input facts in the fact space.

3. The method of claim 2, wherein the data values for the missing input facts are provided by connecting to an external database to import data.

4. The method of claim 2, wherein the data values for the missing input facts are provided by generating synthetic data.

5. The method of claim 1, wherein the elements of the flow chart are associated with a regulatory text by annotations, metadata, or both.

6. The method of claim 1, wherein the algorithm comprises Depth-First Search (DFS).

7. The method of claim 1, wherein each logical expression comprises a conjunction of conditions.

8. The method of claim 1, wherein the output comprises an audit record for the regulatory exploration.

9. The method of claim 8, further comprising enriching the audit record for the regulatory exploration with decision results for each database query of the plurality of database queries.

10. The method of claim 8, wherein the audit record comprises a plurality of decision paths for the regulatory exploration.

11. The method of claim 1, wherein the possibility space is generated by using one or more Data Base Management System (DBMS) JOIN operations to combine all the input facts in the fact space under all the conditions in the query space.

12. A computer-implemented system comprising at least one processor and instructions executable to cause the at least one processor to perform regulatory exploration operations comprising:
   a) receiving a regulatory exploration request comprising a scenario comprising a plurality of input facts and a desired outcome of the scenario, wherein the plurality of input facts are partial inputs incompletely identifying fact constraints of the scenario, and wherein the desired outcome of the scenario identifies one or more result constraints;
   b) receiving an executable regulatory logic flow chart, wherein each element of the flow chart is associated with a regulatory text;
   c) applying an algorithm to determine all paths in the regulatory logic flow chart;
   d) filtering the paths based on the desired outcome of the scenario;
   e) transforming each remaining path into a logical expression comprising attributes;
   f) generating a query space comprising conditions on the input facts, from the plurality of input facts, associated with each attribute;
   g) generating a fact space comprising input facts, from the plurality of input facts, associated with each attribute;
   h) generating a possibility space by joining all the input facts in the fact space under all the conditions in the query space;
   i) converting the possibility space to a plurality of database queries;
   j) running the plurality of database queries; and
   k) generating an output comprising an evaluation of all possibilities within the scenario for regulatory compliance under the regulatory logic.

13. The computer-implemented system of claim 12, wherein the possibility space is generated by using one or more Data Base Management System (DBMS) JOIN operations to combine all the input facts in the fact space under all the conditions in the query space.

14. One or more non-transitory computer-readable storage media encoded with instructions executable by one or more processors to provide a regulatory exploration application comprising:
   a) a software module receiving:
      i. a regulatory exploration request comprising a scenario comprising a plurality of input facts and a desired outcome of the scenario, wherein the plurality of input facts are partial inputs incompletely identifying fact constraints of the scenario, and wherein the desired outcome of the scenario identifies one or more result constraints; and
      ii. an executable regulatory logic flow chart, wherein each element of the flow chart is associated with a regulatory text;
   b) a software module applying an algorithm to determine all paths in the regulatory logic flow chart;
   c) a software module filtering the paths based on the desired outcome of the scenario;
   d) a software module transforming each remaining path into a logical expression comprising attributes;
   e) a software module generating:
      i. a query space comprising conditions on input facts, from the plurality of input facts, associated with each attribute;
      ii. a fact space comprising input facts, from the plurality of input facts, associated with each attribute; and
      iii. a possibility space by joining all the input facts in the fact space under all the conditions in the query space;
   f) a software module converting the possibility space to a plurality of database queries;
   g) a software module running the plurality of database queries; and
   h) a software module generating an output based on the results of the queries, wherein the output comprises an evaluation of all possibilities within the scenario for regulatory compliance under the regulatory logic.

15. The non-transitory computer-readable storage media of claim 14, wherein the possibility space is generated by using one or more Data Base Management System (DBMS) JOIN operations to combine all the input facts in the fact space under all the conditions in the query space.

* * * * *